(12) United States Patent
Hayase et al.

(10) Patent No.: US 12,723,660 B2
(45) Date of Patent: Sep. 1, 2026

(54) HYDROGEN GAS VALVE DEVICE AND HYDROGEN GAS VALVE BODY EQUIPPED THEREWITH

(71) Applicant: KAWASAKI JUKOGYO KABUSHIKI KAISHA, Kobe (JP)

(72) Inventors: Tomoya Hayase, Kobe (JP); Makoto Ninomiya, Kobe (JP); Masayoshi Okamoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 12 days.

(21) Appl. No.: 18/846,596

(22) PCT Filed: Mar. 10, 2023

(86) PCT No.: PCT/JP2023/009376

§ 371 (c)(1), (2) Date: Sep. 12, 2024

(87) PCT Pub. No.: WO2023/176734

PCT Pub. Date: Sep. 21, 2023

(65) Prior Publication Data

US 2025/0389334 A1 Dec. 25, 2025

(30) Foreign Application Priority Data

Mar. 15, 2022 (JP) ................................ 2022-040404

(51) Int. Cl.

| | |
|---|---|
| ***F16K 1/36*** | (2006.01) |
| ***F16K 25/00*** | (2006.01) |
| ***F16K 27/02*** | (2006.01) |
| *F17C 13/04* | (2006.01) |

(52) U.S. Cl.

CPC .............. *F16K 1/36* (2013.01); *F16K 25/005* (2013.01); *F16K 27/02* (2013.01); *F17C 13/04* (2013.01)

(58) Field of Classification Search

CPC .......... F16K 25/005; F16K 1/36; F16K 31/06; F16K 31/08; F16K 31/082

See application file for complete search history.

(56) References Cited

U.S. PATENT DOCUMENTS 8,474,792 B2 * 7/2013 Kubo ........................ F16K 1/42 251/266
2011/0068286 A1 * 3/2011 Nomichi ............. F16K 31/0655 251/129.15

FOREIGN PATENT DOCUMENTS

JP 2014001765 A 1/2014

* cited by examiner

*Primary Examiner* — Michael R Reid
(74) *Attorney, Agent, or Firm* — Alleman Hall LLP

(57) ABSTRACT

A hydrogen gas valve device for controlling a flow of hydrogen gas, the hydrogen gas valve device including a valve body; and a housing that includes a valve port through which hydrogen gas flows, a valve seat around the valve port, and an inner wall surface into which the valve body is inserted and is made of aluminum, chrome-molybdenum steel, or stainless steel. The valve body includes a seat portion that is made of non-thermal plasticity resin and is seated on the valve seat, and a sliding portion that is made of thermal plasticity resin and slides on the inner wall surface.

8 Claims, 9 Drawing Sheets

HYDROGEN GAS VALVE DEVICE AND HYDROGEN GAS VALVE BODY EQUIPPED THEREWITH

TECHNICAL FIELD

The present invention relates to a hydrogen gas valve device for controlling a flow of hydrogen gas and a hydrogen gas valve body equipped therewith.

BACKGROUND ART

As a hydrogen gas valve device, a valve device such as Patent Document 1 has been known, for example. The valve device of Patent Document 1 includes a sleeve having a valve seat sealing face and a poppet valve body.

CITATION LIST

Patent Literature

PTL 1: Japanese Laid-Open Patent Application Publication No. 2014-001765

SUMMARY OF INVENTION

Technical Problem

In the hydrogen gas valve device, in terms of a sealing property, one of a valve seat and a valve body is often composed of resin, and the other is often made of a metal material. In the valve device of Patent Document 1, the sleeve (the valve seat) is made of the metal material. The poppet valve body is made of polyether ether ketone (PEEK) or polyimide (PI). The poppet valve body made of thermal plasticity resin such as polyether ether ketone (PEEK) is difficult to be applied into a valve device in which a seat portion becomes high temperature. Therefore, the poppet valve body made of non-thermoplastic polyimide (PI) is considered to be adopted. However, in the case of the poppet valve body made of non-thermoplastic resin, the poppet valve body is generally manufactured by carving from a block of non-thermoplastic resin. Therefore, entire molding of the poppet valve body is not easy. Further, when the valve body is made of metal, a seat body on which the valve body is seated is made of resin. Therefore, when applying the seat body made of non-thermoplastic resin to the valve device, molding of the seat body is also not easy.

Accordingly, an object of the first invention is to provide a hydrogen gas valve device in which molding of a valve body is facilitated and to provide a hydrogen gas valve body equipped therewith.

Further, an object of the second invention is to provide a hydrogen gas valve device in which molding of a seat body is facilitated.

Solution to Problem

The hydrogen gas valve device of the present invention being a hydrogen gas valve device for controlling a flow of hydrogen gas, is characterized in that the hydrogen gas valve device includes a valve body, and a housing that includes a valve port through which hydrogen gas flows, a valve seat around the valve port, and an inner wall surface into which the valve body is inserted and is made of aluminum, chrome-molybdenum steel, or stainless steel. The valve body includes a seat portion that is made of non-thermal plasticity resin and is seated on the valve seat, and a sliding portion that is made of thermal plasticity resin and slides on the inner wall surface.

According to the present invention, the housing is made of aluminum, chrome-molybdenum steel, or stainless steel. Hence, the housing has hydrogen brittleness resistance to hydrogen. Further, the valve seat included in the housing is also made of aluminum, chrome-molybdenum steel, or stainless steel. Then, the seat portion is repeatedly seated on the valve seat made of aluminum, chrome-molybdenum steel, or stainless steel. In this regard, since the seat portion is made of non-thermal plasticity resin, durability of the seat portion is improved. On the other hand, since the sliding portion is made of thermal plasticity resin, molding of the valve body is facilitated.

The hydrogen gas valve device of the present invention being a hydrogen gas valve body provided for a hydrogen gas valve device for controlling a flow of hydrogen gas, is characterized in that the hydrogen gas valve body includes a seat portion that is made of non-thermal plasticity resin and is seated on a valve seat, and a sliding portion that is made of thermal plasticity resin and is slidably inserted into a housing of the hydrogen gas valve device.

According to the present invention, since the seat portion that is seated on the valve seat is made of non-thermal plasticity resin, the durability of the seat portion is improved relative to repeated seating. On the other hand, since the sliding portion is made of thermal plasticity resin, injection molding becomes possible. Thereby, the sliding portion of the valve body is easily shaped. That is, the molding of the valve body is facilitated.

The hydrogen gas valve device of the present invention being a hydrogen gas valve device for controlling a flow of hydrogen gas, is characterized in that the hydrogen gas valve device includes a valve body that is made of aluminum, chrome-molybdenum steel, or stainless steel, and a housing into which the valve body is inserted. The housing includes a seat body on which the valve body is seated, and a housing main body in which the seat body is housed. The seat body includes a seat body main body that has a valve port through which hydrogen gas flows, and a valve seat member that is provided around the valve port and faces the valve body. The seat body main body is made of thermal plasticity resin. The valve seat member is made of non-thermal plasticity resin.

According to the present invention, since the valve body is made of aluminum, chrome-molybdenum steel, or stainless steel, the valve body has hydrogen brittleness resistance to hydrogen. On the other hand, the valve body made of aluminum, chrome-molybdenum steel, or stainless steel is repeatedly seated on the valve seat member. Since the valve seat member is made of non-thermal plasticity resin, durability of the valve seat member is improved. On the other hand, since the seat body main body is made of thermal plasticity resin, the molding of the seat body is facilitated.

Advantageous Effects of Invention

According to the present invention, the molding of the valve body and the seat body is facilitated.

The above-described objects, other objects, features, and advantages of the present invention are revealed from the detailed description of the following preferred embodiments with reference to the accompanying drawings.

DESCRIPTION OF EMBODIMENTS

Hereinafter, valve devices 1,1A of the first and second embodiments according to the present invention and main valve bodies 12,12A respectively provided therein are described with reference to the above-described drawings. A concept of the direction used in the following description is used for convenience when explaining, and does not limit the direction of a constitution of the invention into such direction. Further, the valve devices 1,1A and the main valve bodies 12,12A are merely one embodiment of the present invention. Accordingly, the present invention is not limited to the embodiment, and may be added, deleted, or changed without departing from the spirit of the invention.

Embodiment 1

Figure 1:
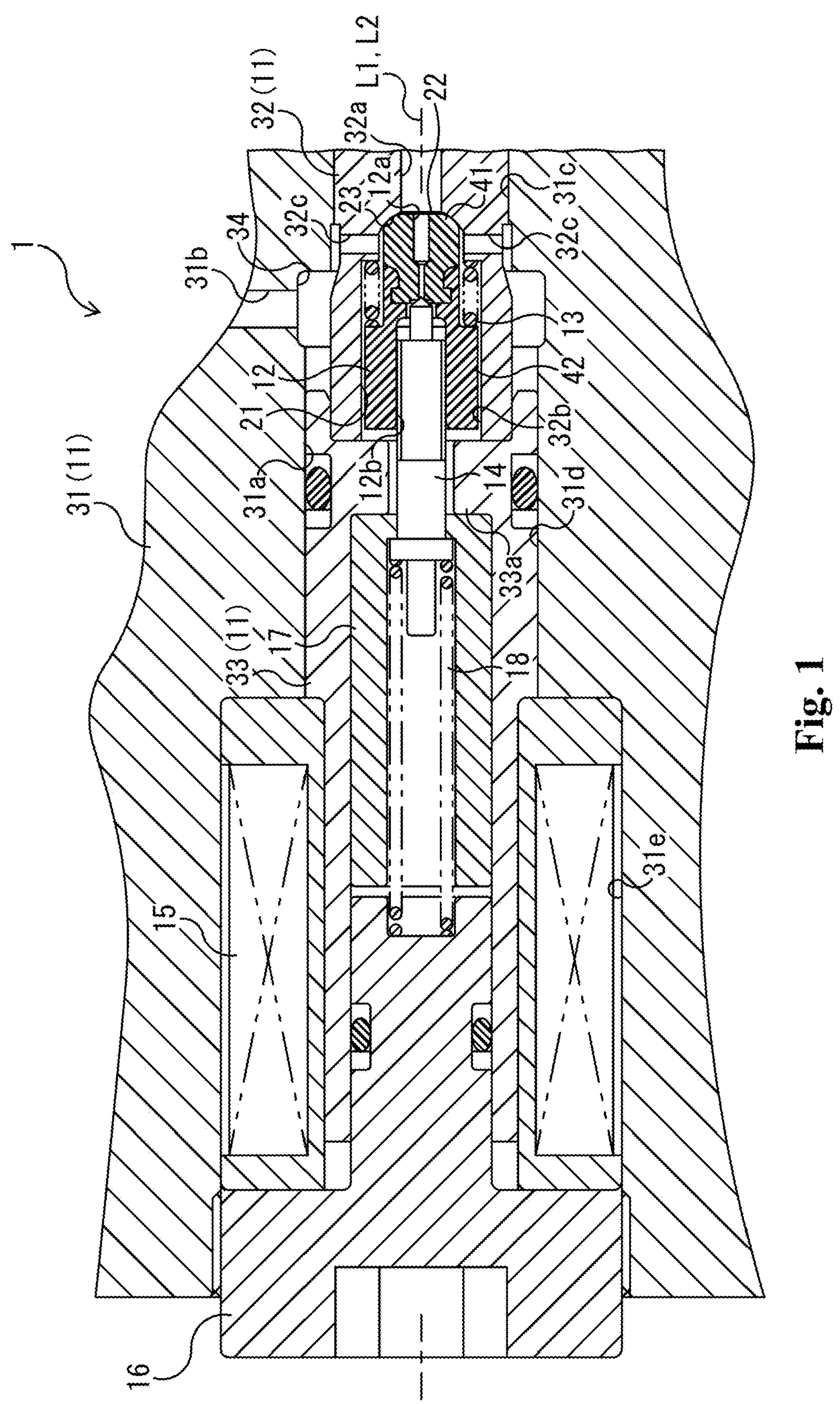
FIG. 1 is a cross-sectional view of the valve device of the first embodiment of the present invention.

The valve device 1 of the first embodiment illustrated in FIG. 1 is a hydrogen gas valve device for controlling a flow of hydrogen gas. The valve device 1 is provided in a flow path through which hydrogen gas flows. The valve device 1 is provided for a pressure vessel into which hydrogen gas is filled, for instance; more specifically, the valve device 1 is provided for a tank valve that is provided in a high-pressure tank, not illustrated. And, the valve device 1 controls filling and discharge of hydrogen gas that is stored in the high-pressure tank. In the present embodiment, the valve device 1 is a solenoid valve device, and opens a passage of the tank valve, for example, a valve passage 32*a* described later, by energization. Herein, the valve device 1 is the solenoid valve device of a pilot type. The valve device 1 includes a housing 11, the main valve body 12, a first spring member 13, a pilot valve body 14, a solenoid 15, a fixed magnetic pole 16, a plunger 17, and a second spring member 18.

<Housing>

The housing 11 is made of aluminum, chrome-molybdenum steel, or stainless steel. In the present embodiment, the housing 11 is made of aluminum. The housing 11 includes an inner wall surface 21 into which the main valve body 12 is inserted, a valve port 22 through which gas flows, and a valve seat 23 around the valve port 22. More specifically, the housing 11 includes a housing main body 31, a seat body 32, and a guide member 33.

The housing main body 31 has an insertion hole 31*a* and a housing passage 31*b*. The insertion hole 31*a* extends along a predetermined axial line L1 in the housing passage 31*b*. More specifically, in order from one side in the axial line direction in which the axial line L1 extends, the insertion hole 31*a* has a small diameter portion 31*c*, a medium diameter portion 31*d*, and a large diameter portion 31*e*. And, the housing passage 31*b* is connected to the insertion hole 31*a* through an opening on a side face of the medium diameter portion 31*d*.

The seat body 32 is inserted into the insertion hole 31*a* so that an axial line of the seat body 32 coincides with the axial line L1. More specifically, the seat body 32 is arranged from the small diameter portion 31*c* to the medium diameter portion 31*d*. Further, the seat body 32 directly or indirectly comes into contact with a bottom of the insertion hole 31*a*, not illustrated.

The seat body 32 includes the inner wall surface 21, the valve port 22, and the valve seat 23. The seat body 32 is in a cylindrical shape. Further, an inner hole of the seat body 32 has the valve passage 32*a* and a sliding hole 32*b*. The valve passage 32*a* is connected to the sliding hole 32*b* through the valve port 22. Furthermore, the valve passage 32*a* is located on one side in the axial line direction from the valve port 22. The sliding hole 32*b* is located on the other side in the axial line direction from the valve port 22. The main valve body 12 is inserted into the sliding hole 32*b*. Then, the main valve body 12 slides along the inner wall surface 21 of the sliding hole 32*b*. Further, the sliding hole 32*b* has a diameter greater than that of the valve passage 32*a*. The valve seat 23 is formed around the valve port 22.

The seat body 32 has a plurality of side holes 32*c*. In the seat body 32, the plurality of side holes 32*c* are arranged so as to be spaced in the circumferential direction and penetrate in the radial direction. Further, an annular passage 34 is formed between the seat body 32 and the insertion hole 31*a*. Furthermore, the plurality of side holes 32*c* are opened toward the annular passage 34. Moreover, the annular passage 34 is connected to the housing passage 31*b*. Thereby, the valve passage 32*a* is connected to the housing passage 31*b* through the sliding hole 32*b*, the plurality of side holes 32*c*, and the annular passage 34.

<Guide Member>

In the guide member 33, the pilot valve body 14 and the plunger 17 are inserted. Then, the guide member 33 slides and guides the plunger 17. The guide member 33 is a cylindrical member made of metal. The guide member 33 is inserted into the insertion hole 31*a*. More specifically, the guide member 33 is inserted into the large diameter portion 31*e*. In addition, the guide member 33 comes into contact with another end of the seat body 32. Further, the guide member 33 fixes the seat body 32 by directly or indirectly pressing the seat body 32 against the bottom of the insertion hole 31*a*. Furthermore, the guide member 33 has a stopper 33*a*. The stopper 33*a* protrudes inward in the circumferential direction from an inner circumferential face of the guide member 33.

<Main Valve Body>

The main valve body 12 as one example of the valve body is inserted into the insertion hole 31*a*. Then, the main valve body 12 slides along the inner wall surface 21 of the housing 11. More specifically, the main valve body 12 is inserted into the sliding hole 32*b* of the seat body 32. Then, the main valve body 12 slides along the inner wall surface 21 of the seat body 32. The main valve body 12 is seated on the valve seat 23. Thereby, the valve passage 32*a* is closed. Further, the main valve body 12 is externally attached with the first spring member 13. Then, the main valve body 12 is biased by the first spring member 13 and separates from the valve seat 23. Thereby, the valve passage 32*a* is opened. Thus, the main valve body 12 opens and closes the valve passage 32*a*, and thereby the flow of hydrogen gas is controlled.

Figure 2:
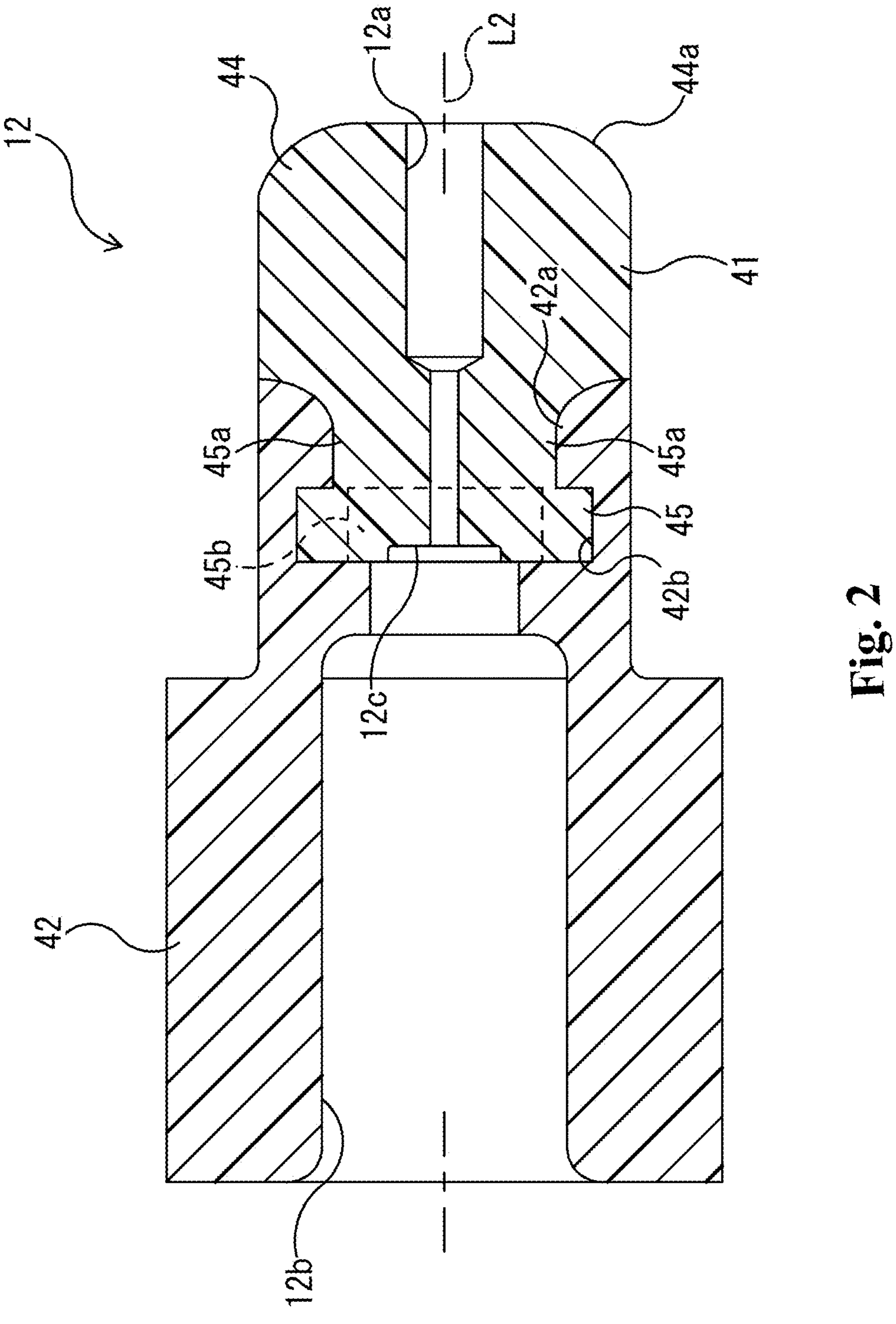
FIG. 2 is an enlarged cross-sectional view illustrated by taking out a main valve body from the valve device of FIG. 1.

As illustrated in FIG. 2, the main valve body 12 has a communication passage 12*a*, an insertion hole 12*b*, and a seating portion 12*c*. The communication passage 12*a* is opened toward the valve port 22. The insertion hole 12*b* is connected to the communication passage 12*a*. The communication passage 12*a* and the insertion hole 12*b* are formed along an axial line L2 of the main valve body 12. The communication passage 12*a* and the insertion hole 12*b* are connected to each other. Then, the communication passage 12*a* is opened at one end of the main valve body 12, and the insertion hole 12*b* is opened at another end of the main valve body 12. Further, the seating portion 12*c* is formed around an opening facing the insertion hole 12*b* in the communication passage 12*a*.

The main valve body 12 includes a seat portion 41 and a sliding portion 42. The seat portion 41 is made of non-thermal plasticity resin, and is seated on the valve seat 23. Herein, the non-thermal plasticity resin is a resin material that is not thermal plasticity resin, and is a resin that hardens when heated, for example. In the present embodiment, the non-thermal plasticity resin is Vespel® SP-1. However, the non-thermal plasticity resin is not limited to Vespel® SP-1. In addition, the non-thermal plasticity resin includes a thermohardening resin. The seat portion 41 forms a part on one side in the axial line direction of the main valve body 12. In the present embodiment, the seat portion 41 is formed in a cylindrical shape. An inner hole of the seat portion 41 forms the communication passage 12*a*. In the seat portion 41, a part around the opening on the other side in the axial line direction of the inner hole forms the seating portion 12*c*. Therefore, the seating portion 12*c* is also made of non-thermal plasticity resin.

Figure 3:
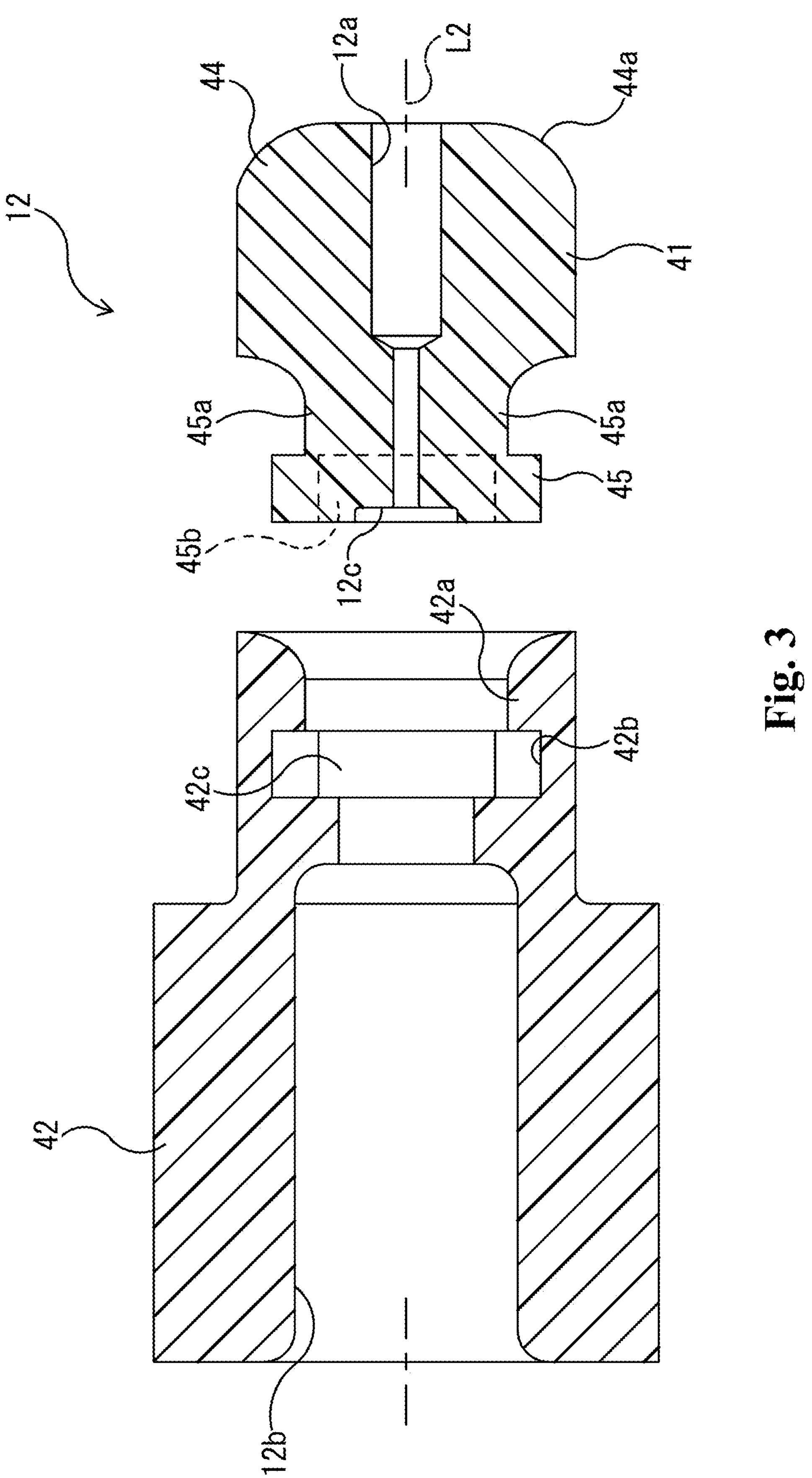
FIG. 3 is an exploded cross-sectional view illustrated by disassembling the valve body of FIG. 2.
Figure 4:
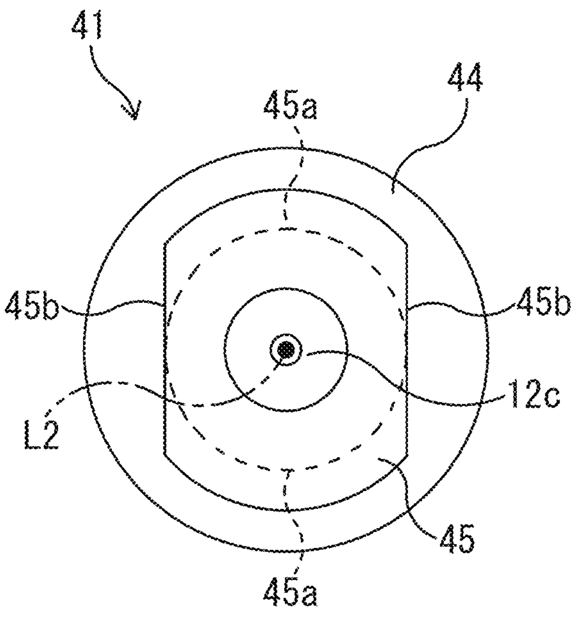
FIG. 4. is a left side view illustrating a seat portion of FIG. 3 from the left side of the paper.

As also illustrated in FIG. 3, the seat portion 41 has a seating part 44 and an engagement portion 45. The seating part 44 has a seat face 44*a* at one end in the axial line direction. Then, the valve port 22 is closed by seating the seat face 44*a* on the valve seat 23. The engagement portion 45 protrudes from another end in the axial line direction of the seating part 44 into to the other side in the axial line direction. Further, the engagement portion 45 has a constriction 45*a* and an engagement-portion-side flat face 45*b*. The constriction 45*a* is recessed in the radial direction. More specifically, the constriction 45*a* is provided on a side of the seating part 44 in the engagement portion 45, and is arranged in plural at intervals in the circumferential direction. In the present invention, the constriction 45*a* is arranged at two places spaced at 180 degrees in the circumferential direction. The engagement-portion-side flat faces 45*b* are radially intersecting faces, also refer to FIG. 4. In the present embodiment, the engagement-portion-side flat faces 45*b* are faces that are orthogonal in the radial direction. Further, the engagement-portion-side flat faces 45*b* are located on another end side in the axial line direction from the constriction 45*a* in the engagement portion 45. Moreover, the constriction 45*a* may be formed over a whole circumference in the circumferential direction of the engagement portion 45.

The sliding portion 42 is made of thermal plasticity resin, and slides along the inner wall surface 21 as illustrated in FIG. 1. Herein, the thermal plasticity resin is a resin that melts or softens when heated and thereafter solidifies by cooling. In the present embodiment, the thermal plasticity resin is polyether ether ketone (PEEK). However, the thermal plasticity resin is not limited to PEEK. In the present embodiment, the sliding portion 42 is formed in a cylindrical shape. Further, an inner hole of the sliding portion 42 forms the insertion hole 12*b*. More specifically, the engagement-portion-side flat faces 45*b* are each arranged between a plurality of constrictions 45*a*. The engagement-portion-side flat faces 45*b* are each arranged at a position shifted at 180 degrees from each other.

The sliding portion 42 is inserted into the sliding hole 32*b* of the seat body 32. Then, the sliding portion 42 slides along the inner wall surface 21 as described above. The sliding portion 42 is arranged around the engagement portion 45, and is fixed to the seat portion 41 so as not to be relatively moved.

The sliding portion 42 has an engagement protrusion 42*a* and a sliding-portion-side flat face 42*c*. The engagement protrusion 42*a* is engaged with the constriction 45*a*. The sliding-portion-side flat face 42*c* comes into contact with the engagement-portion-side flat face 45*b*. More specifically, the sliding portion 42 has an engagement hole 42*b* of which shape is corresponding to the engagement portion 45 at a part on one side in the axial line direction of the sliding portion 42. Further, the engagement hole 42*b* has the engagement protrusion 42*a* at a position each corresponding to the plurality of constrictions 45*a*, and has the sliding-portion-side flat face 42*c* at a position corresponding to the engagement-portion-side flat face 45*b*. Therefore, by fitting the engagement portion 45 into the engagement hole 42*b*, the sliding portion 42 is fixed to the seat portion 41 so as not to be moved in the axial line direction and in a non-rotatable manner, that is, so as not to be relatively moved.

<Pilot Valve Body>

The pilot valve body 14 moves so as to open and close the communication passage 12*a*. More specifically, the pilot valve body 14 is slidably inserted into the insertion hole 12*b* of the main valve body 12. Then, a tip portion of the pilot valve body 14 is seated on the seating portion 12*c* of the main valve body 12. Thereby, the communication passage 12*a* is closed. Further, the pilot valve body 14 moves so as to separate from the seating portion 12*c*. Thereby, the communication passage 12*a* is opened.

<Solenoid and Fixed Magnetic Pole>

The solenoid 15 is housed in the housing 11. More specifically, the solenoid 15 is externally attached to the guide member 33. The solenoid 15 generates a magnetic field when energized. The fixed magnetic pole 16 is provided at the housing main body 31 so as to shut an opening of the insertion hole 31*a*. And, the fixed magnetic pole 16 presses the solenoid 15 against the housing main body 31. Further, the fixed magnetic pole 16 inserts a tip portion into the guide member 33. Then, the fixed magnetic pole 16 moves the main valve body 12 by generating excitation force in cooperation with the solenoid 15.

<Plunger>

The plunger 17 is made of a magnetic material. Then, the plunger 17 moves the pilot valve body 14 into the other side in the axial line direction according to an energization state of the solenoid 15. More specifically, the plunger 17 is inserted into the guide member 33. And, the plunger 17 is arranged on the other side in the axial line direction from the stopper 33*a*. Then, the pilot valve body 14 is inserted into the plunger 17, and the plunger 17 is engaged with the pilot valve body 14. Therefore, when the plunger 17 moves toward the other side in the axial line direction, the pilot valve body 14 is lifted. Thereby, the pilot valve body 14 is separated from the seating portion 12*c*.

<Second Spring Member>

The second spring member 18 as a biasing member biases the pilot valve body 14. Then, the second spring member 18 seats the pilot valve body 14 on the seating portion 12*c* by biasing. Further, the second spring member 18 presses the main valve body 12 against the valve seat 23 through the seating pilot valve body 14. In the present embodiment, the second spring member 18 is a compression coil spring. Furthermore, the second spring member 18 is inserted into the plunger 17 by being compressed between the fixed magnetic pole 16 and the pilot valve body 14.

<Operation of Valve Device>

In the valve device 1, the main valve body 12 is seated on the valve seat 23, and thereby the valve port 22 is closed. As a result, the flow of gas in the valve device 1 is stopped. Then, when hydrogen gas having a higher pressure than a gas pressure of the housing passage 31*b* flows into the valve passage 32, the main valve body 12 is lifted against biasing force of the second spring member 18. Thereby, the valve port 22 is opened. Then, hydrogen gas is guided from the valve passage 32*a* into the housing passage 31*b* through the sliding hole 32*b*, the side holes 32*c*, and the annular passage 34. Then, when a differential pressure between the gas pressure of the housing passage 31*b* and a gas pressure of the valve passage 32*a* becomes a predetermined value, the main valve body 12 is seated on the valve seat 23. Thereby, the valve port 22 is closed. Then, the flow of gas in the valve device 1 is stopped.

Next, when the solenoid 15 is energized, the main valve body 12 moves toward an open position by the generation of excitation force. More specifically, when the solenoid 15 is energized, the plunger 17 is absorbed on the fixed magnetic pole 16. Thereby, the pilot valve body 14 is lifted against the biasing force of the second spring member 18. Then, since the communication passage 12*a* is opened, the housing passage 31*b* and the valve passage 32*a* are connected through the communication passage 12*a*. Thereby, the gas pressure of the valve passage 32*a* increases. Then, the main valve body 12 is lifted by the first spring member 13. Thereby, the main valve body 12 is separated from the valve seat 23. And then, the valve port 22 is opened. Thus, the housing passage 31*b* and the valve passage 32*a* are connected through the annular passage 34, the side holes 32*c*, and the sliding hole 32*b*. Thereby, hydrogen gas flows from the housing passage 31*b* into the valve passage 32*a*.

According to the valve device 1 of the first embodiment, the housing 11 is made of aluminum. Therefore, the housing 11 has the hydrogen brittleness resistance. Further, the valve seat 23 included in the housing 11 is also made of aluminum. Then, the seat portion 41 is repeatedly seated on the valve seat 23 made of aluminum. In this regard, since the seat portion 41 is made of non-thermal plasticity resin, durability of the seat portion 41 is improved. Further, since the sliding portion 42 is made of thermal plasticity resin, molding of the main valve body 12 is facilitated. For instance, the sliding portion 42 becomes possible to be molded by pouring thermal plasticity resin into a mold. In addition, when the housing 11 is made of chrome-molybdenum steel or stainless steel, similar effects are exerted in the same manner as when the housing 11 is made of aluminum.

According to the valve device 1 of the first embodiment, by arranging the sliding portion 42 around the engagement portion 45 of the seat portion 41, the seat portion 41 is fixed to the sliding portion 42 so as not to be relatively moved. Thereby, partial contact between the seat portion 41 and the valve seat 23 are suppressed. Further, since the seat portion 41 is fixed to the sliding portion 42 by the engagement portion 45, the main valve body 12 is molded with a simple structure.

Further, according to the valve device 1 of the first embodiment, by engaging the engagement protrusion 42*a* with the constriction 45*a*, relative movement of the seat portion 41 to the sliding portion 42 in the axial line direction is suppressed. Furthermore, the main valve body 12 is molded with a simple structure by the constriction 45*a* and the engagement protrusion 42*a*.

Furthermore, according to the valve device 1 of the first embodiment, by making the engagement-portion-side flat face 45*b* come into contact with the sliding-portion-side flat face 42*c*, relative movement of the seat portion 41 to the sliding portion 42 around the axial line, i.e., relative rotation, is suppressed. In addition, the main valve body 12 is thereby molded with a simple structure by the engagement-portion-side flat face 45*b* and the sliding-portion-side flat face 42*c*.

According to the valve device 1 of the first embodiment, the seating portion 12*c* on which the pilot valve body 14 is seated is also made of non-thermal plasticity resin. Accordingly, durability of the main valve body 12 is improved.

Further, according to the main valve body 12 of the first embodiment, since the seat portion 41 that is seated on the valve seat 23 is made of non-thermal plasticity resin, the durability of the seat portion 41 is improved relative to repeated seating. On the other hand, since the sliding portion 42 is made of thermal plasticity resin, the sliding portion 42 is able to be made, for instance, by injection molding. Thereby, the sliding portion 42 of the main valve body 12 is easily shaped. That is, the molding of the main valve body 12 is facilitated.

Embodiment 2

A valve device 1A and a main valve body 12A of the second embodiment are similar in configuration to the valve device 1 and the main valve body 12 of the first embodiment. Accordingly, a configuration of the valve device 1A of the second embodiment is mainly explained in terms of differences from the valve device 1 and the main valve body 12 of the first embodiment, the same configuration is allotted with the same reference numerals, and description thereof is omitted.

Figure 5:
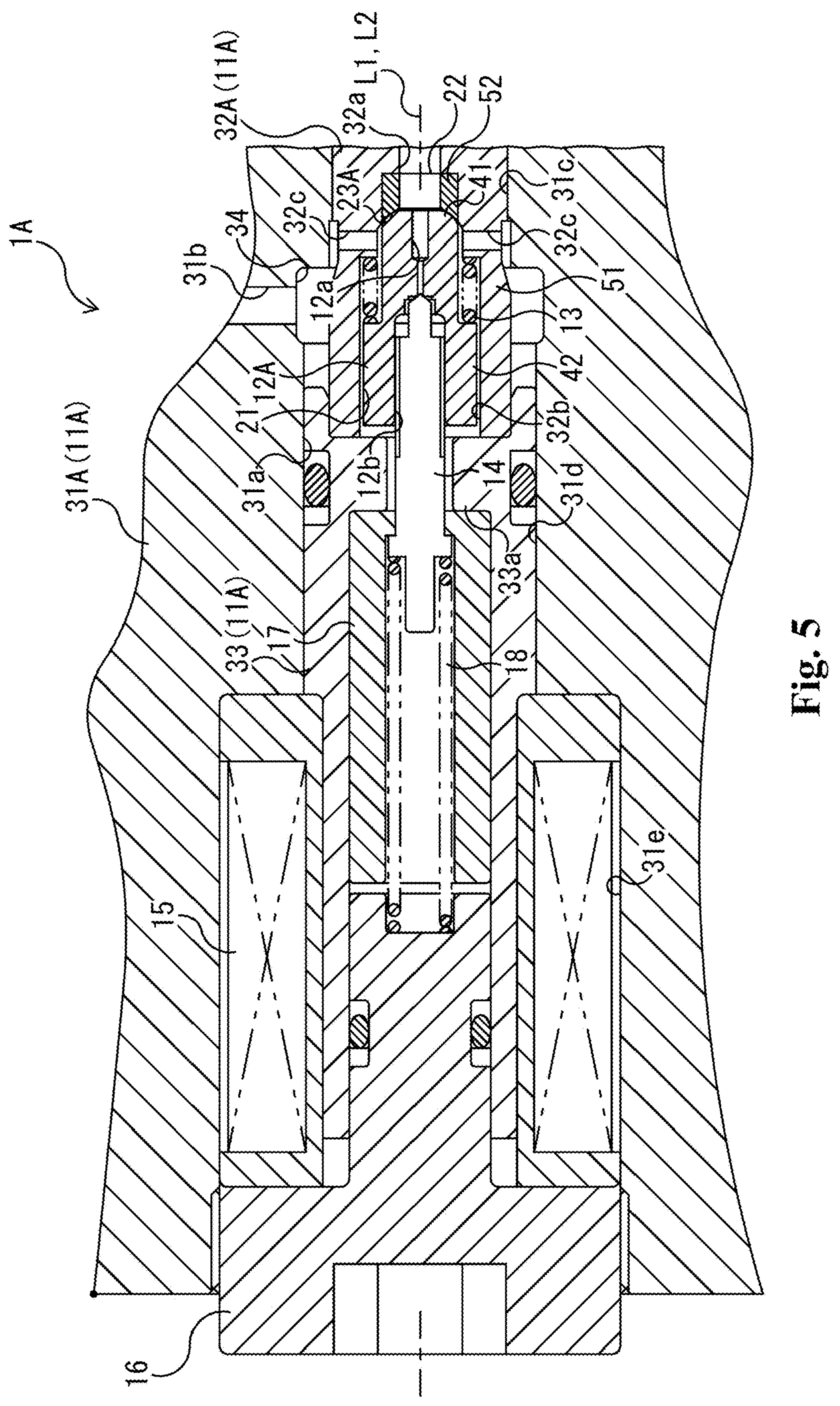
FIG. 5 is a cross-sectional view of the valve device of the second embodiment of the present invention.

As illustrated in FIG. 5, the valve device 1A of the second embodiment includes a housing 11A, the main valve body 12A, the first spring member 13, the pilot valve body 14, the solenoid 15, the fixed magnetic pole 16, the plunger 17, and the second spring member 18. Further, in FIG. 5, the housing 11A and the main valve body 12A are mainly illustrated.

<Housing>

The main valve body 12A is inserted into the housing 11A. The housing 11A includes a housing main body 31A, a seat body 32A, and the guide member 33. The housing main body 31A is made of aluminum, chrome-molybdenum steel, or stainless steel. In the present embodiment, the housing main body 31A is made of aluminum. The seat body 32A is housed in the housing main body 31A.

In the present embodiment, the seat body 32A includes a seat body main body 51 and a valve seat member 52. The seat body main body 51 has the inner wall surface 21 and the valve port 22. Further, an inner hole is formed in the seat body main body 51. Furthermore, the inner hole of the seat body main body 51 forms the valve passage 32*a*, the sliding hole 32*b*, and the plurality of side holes 32*c*.

The seat body main body 51 is made of thermal plasticity resin. In the present embodiment, the thermal plasticity resin is PEEK. However, the thermal plasticity resin is not limited to PEEK. Further, the valve seat member 52 is made of non-thermal plasticity resin. In the present embodiment, the non-thermal plasticity resin is Vespel® SP-1. However, the non-thermal plasticity resin is not limited to Vespel® SP-1. In addition, the non-thermal plasticity resin includes the thermohardening resin.

The valve seat member 52 is arranged around the valve port 22. The valve seat member 52 forms a valve seat 23A around the valve port 22. That is, the valve seat member 52 faces the main valve body 12A. Then, the main valve body 12A is seated on the valve seat member 52. The valve seat member 52 is formed in a cylindrical shape. An inner hole of the valve seat member 52 faces the valve port 22 of the seat body main body 51.

The main valve body 12A is made of aluminum, chrome-molybdenum steel, or stainless steel. In the present embodiment, the main valve body 12A is made of aluminum. The main valve body 12A has the same shape as the main valve body 12 of the first embodiment. Further, the main valve body 12A may be integrated. Furthermore, the main valve body 12A may be configured by a plurality of members in the same manner as the main valve body 12. Then, the main valve body 12A slides along an inner wall surface 21 of the housing 11A, more specifically, the inner wall surface 21 of the seat body main body 51.

According to the valve device 1A of the second embodiment, the main valve body 12A is made of aluminum. Therefore, the main valve body 12A has hydrogen brittleness resistance. On the other hand, the main valve body 12A made of aluminum is repeatedly seated on the valve seat member 52. However, since the valve seat member 52 is made of non-thermal plasticity resin, durability of the valve seat member 52 is improved. Further, the seat body main body 51 is made of thermal plasticity resin, molding of the seat body 32A is facilitated.

In addition, the valve device 1A and the main valve body 12A of the second embodiment exert similar effects to the valve device 1 and the main valve body 12 of the first embodiment.

Other Embodiments

The valve device 1 of the present embodiment is the solenoid valve device of the pilot type. The main valve body 12 is moved through the pilot valve body 14 and the plunger 17, but the valve device 1 of the present embodiment not necessarily need to be configured in such way. That is, the main valve body 12 may be absorbed on the fixed magnetic pole 16. Further, the second spring member 18 may bias the main valve body 12 towards a closed position. Furthermore, the valve device 1 is not necessarily limited to the solenoid valve device, but may be a relief valve or a check valve thereof.

The main valve bodies 12, 12A are molded in such a manner that the sliding portion 42 is insert-molded to the seat portion 41 made of non-thermal plasticity resin, but may be molded by other methods. For instance, the main valve bodies 12, 12A may be formed in such a manner that the seat portion 41 and the sliding portion 42 are fitted to each other or are screwed with each other. Further, the main valve bodies 12, 12A may be formed in such a manner that the seat portion 41 and the sliding portion 42 are fastened by a fastener such as a bolt. Furthermore, the seat portion 41 not necessarily need to have the engagement portion 45, and the sliding portion 42 may have an engagement portion. In such a case, an engagement hole corresponding to the engagement portion 45 is formed in the seat portion 41.

Further, in the valve device 1 of the present embodiment, the seat bodies 32, 32A have the inner wall surface 21, but the housing main bodies 31, 31A or the guide member 33 may have the inner wall surface 21. That is, the main valve bodies 12, 12A may be slidably supported by the housing main bodies 31, 31A or the guide member 33.

Furthermore, in the valve device 1 of the present embodiment, rotation prevention is achieved by coming into contact with the engagement-portion-side flat face 45*b* and the sliding-portion-side flat face 42*c*. However, the valve device 1 of the present embodiment is not limited to such an aspect. For instance, the rotation prevention may be achieved by forming a cutting mark on an outer circumferential surface of the engagement portion 45 or an inner circumferential surface of the engagement hole of the sliding portion 42. Further, a shape of the outer circumferential surface of the engagement portion 45 may be an elliptical shape. Furthermore, the rotation prevention may be achieved by forming unevenness on the outer circumferential surface of the engagement portion 45 or the inner circumferential surface of the engagement hole of the sliding portion 42. The unevenness may be processed with a surface roughing material or may be simply formed by an uneven portion.

Figure 6:
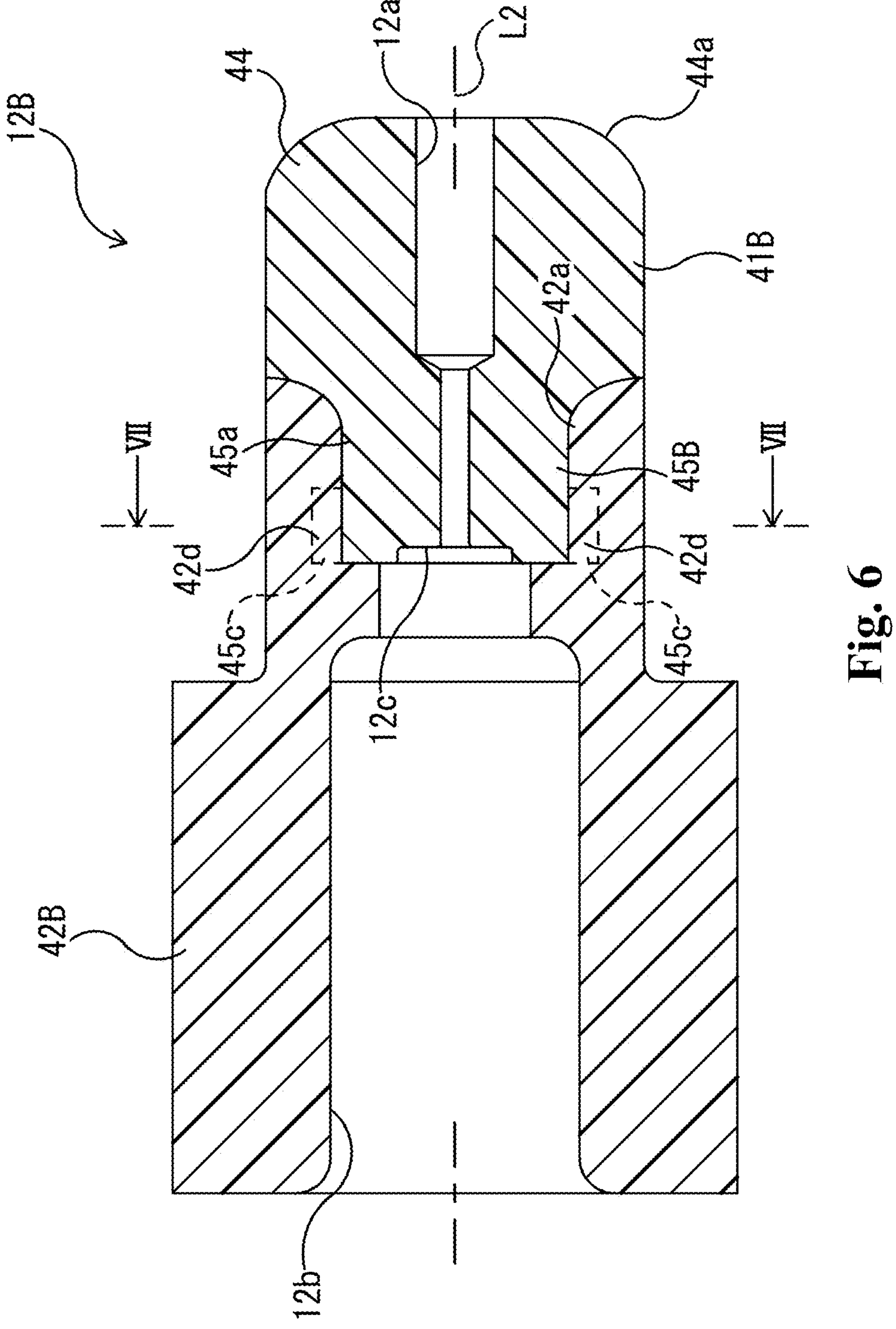
FIG. 6 is a cross-sectional view illustrating the main valve body of another embodiment of the present invention.
Figure 7:
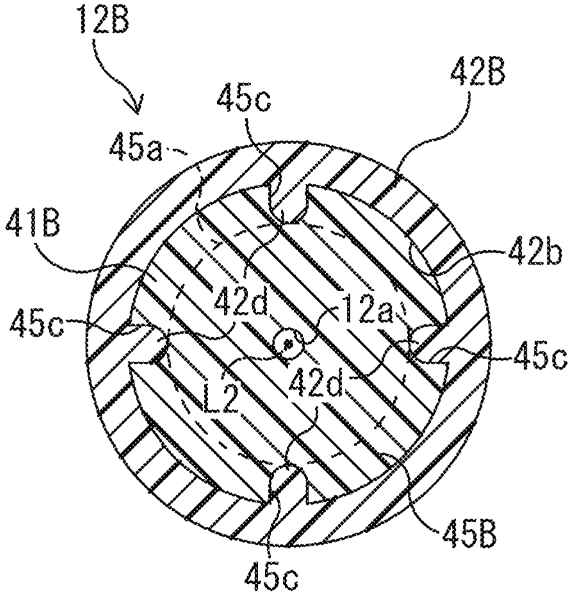
FIG. 7 is a cross-sectional view seen the main valve body of FIG. 6 by taking along the line VII-VII.

As an example of forming the unevenness, a main valve body 12B may be configured as follows as illustrated in FIG. 6 and FIG. 7. The main valve body 12B has a locking groove 45*c* on another end side in the axial line direction from the constriction 45*a* in an engagement portion 45B. In the present embodiment, the engagement portion 45B has four locking grooves 45*c*. However, the number of locking grooves 45*c* is not limited to the above, and may be one or more than five. The four locking grooves 45*c* are arranged so as to evenly spaced in the circumferential direction. The four locking grooves 45*c* are recessed in the radial direction. The sliding portion 42B has a locking protrusion 42*d* at a position corresponding to each of the locking grooves 45*c* in the engagement hole 42*b*. The locking protrusion 42*d* protrudes into the radial direction. The locking protrusion 42*d* is each engaged with the locking grooves 45*c* in a state in which the engagement portion 45B is fitted into the engagement hole 42*b*. Thereby, the sliding portion 42B is fixed to the seat portion 41B in a non-rotatable manner. The same effect is exerted even if a locking protrusion is formed at the engagement portion 45B and a locking groove is formed in the engagement hole 42*b* of the sliding portion 42B. Further, the locking grooves 45*c* need not to reach the constriction 45*a* in the axial direction in the engagement portion 45B, and may be sufficient even if the locking grooves 45*c* extend only to a middle part in the axial direction. In such circumstances, an end face of the constriction 45*a* in the locking grooves 45*c* may be formed in a partially spherical face shape, for example, a quarter hemisphere face shape.

Figure 8:
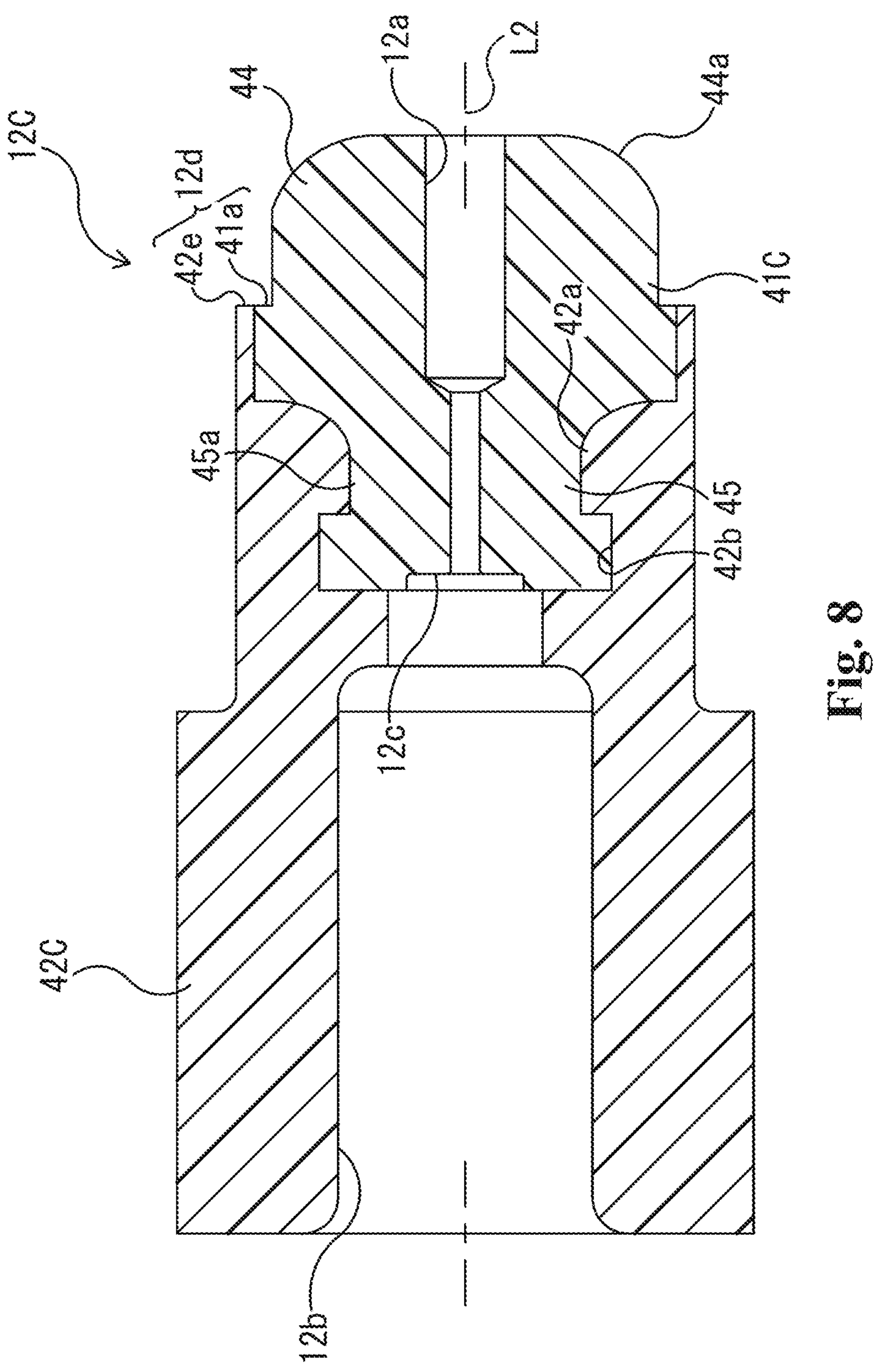
FIG. 8 is a cross-sectional view illustrating the main valve body of further another embodiment of the present invention.

Further, in the valve devices 1,1A, the main valve bodies 12,12A may be configured like a main valve body 12C illustrated in FIG. 8. That is, the main valve body 12C is formed by two-color molding, and is molded by injection-molding a sliding portion 42C as secondary material around an engagement portion 45 of a seat portion 41C as basic material. Furthermore, the sliding portion 42C may be the basic material, and the seat portion 41C may be the secondary material. The main valve body 12C includes a molded boundary part 12*d*. In the molded boundary part 12*d*, the seat portion 41 and the sliding portion 42C are adjacent to each other and are exposed, namely, appear on an outer surface. And, in the main valve body 12C, a surface of the sliding portion 42 is formed by a rough surface. On the other hand, a surface of the seat portion 41 is machined in the present embodiment.

More specifically, an outer circumferential part of the seat portion 41C is formed with a step portion 41*a*. Further, the step portion 41*a* is formed in a flush shape with an axial direction one end face 42*e* of the sliding portion 42. Therefore, in the main valve body 12C, the molded boundary portion 12*d* in which the axial direction one end face 42*e* and the step portion 41*a* are adjacent to each other is formed, and the molded boundary portion 12*d* is exposed so as to face the one side in the axial direction. Further, the step portion 41*a* of the seat portion 41C is machined before the sliding portion 42C is injection-molded. On the other hand, the sliding portion 42C is not machined and is a rough surface in an unprocessed state after injection molding.

When machining is applied to the molded boundary portion 12*d* of the main valve body 12C, that is, machining is applied after injection molding of the secondary material, burrs occur and are difficult to be completely removed by machining. Therefore, by making the rough surface without machining with respect to an axial direction one end face 42*e* of the sliding portion 42C, the burrs are suppressed from occurring. Further, in the main valve body 12C, the molded boundary portion 12*d* is exposed toward the one side in the axial direction. Accordingly, even if the axial direction one end face 42*e* of the sliding portion 42C is formed by the rough surface, sliding of the main valve body 12C is not affected. Thereby, the sliding portion 42C is smoothly moved while suppressing occurrence of the burrs. However, the molded boundary portion 12*d* necessarily need not to be formed at the part facing toward the one side in the axial direction of the outer circumferential surface, and may be formed at any part within the outer circumferential surface.

Figure 9:
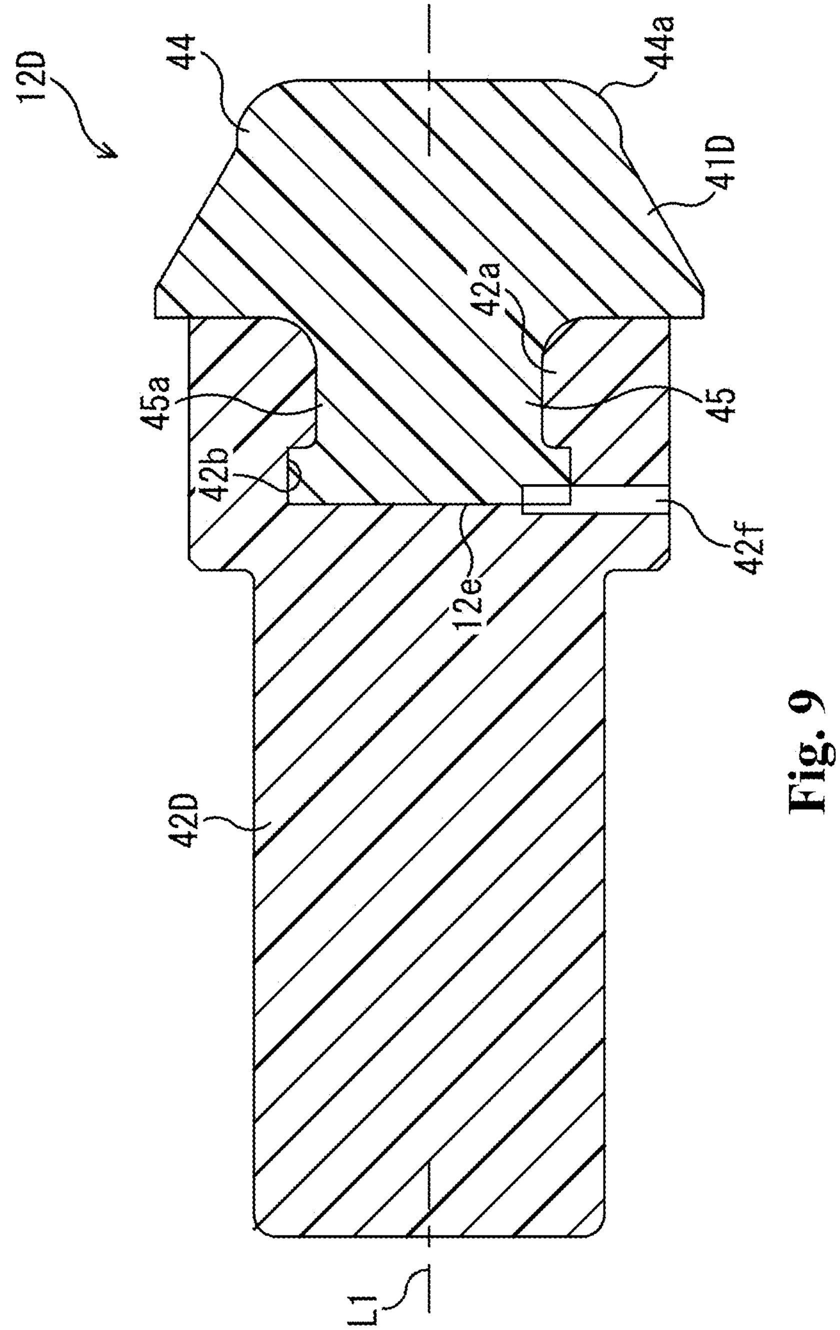
FIG. 9 is a cross-sectional view illustrating the valve body of another embodiment of the present invention.

Further, as illustrated in FIG. 9, a valve body 12D does not have the communication passage 12*a* but may have a communication hole 42*f* instead. The valve body 12D is used as the relief valve or the check valve, for example. The valve body 12D includes a seat portion 41D and a sliding portion 42D. The sliding portion 42D has the engagement hole 42*b* and the communication hole 42*f*. The engagement hole 42*b* as one example of a fitting hole is a hole with a bottom. In the engagement hole 42*b*, the sliding portion 42D is fitted and engaged. In the present embodiment, an engagement portion 45 of the seat portion 41D is fitted to and is engaged with the engagement hole 42*b*. In the present embodiment, the communication hole 42*f* connects a gap 12*e* and an outer circumferential surface of the valve body 12D. More specifically, the communication hole 42*f* extends in the radial direction of the valve body 12D and is opened at an outer circumferential surface of the sliding portion 42D. Further, the communication hole 42*f* is on a bottom side of the engagement hole 42*b* and is connected to the gap 12*e* between the seat portion 41D and the sliding portion 42D. However, the communication hole 42*f* may extend in the axial direction of the valve body 12D, and, for instance, may be opened at an end face in the axial direction of the sliding portion 42D.

In the valve body 12D configured as above, hydrogen accumulated in the gap 12*e* is discharged outside of the valve body 12D through the communication hole 42*f*. In the valve body 12D, by discharging hydrogen accumulated in the gap 12*e* outside of the valve body 12D, an increase of internal pressure in the gap 12*e* is suppressed. Further, although the valve body 12D does not have the communication passage 12*a* in FIG. 9, the valve body 12D has the communication passage 12*a* and may be additionally provided with the communication hole 42*f*.

From the above description, much improvement and other embodiments of the present invention are apparent to those skilled in the art. Accordingly, the above description should be interpreted only as an example and is provided for the purpose of teaching those skilled in the art the best mode for performing the present invention. Without departing from the spirit of the present invention, details of the structure and/or function may be substantially changed.

REFERENCE CHARACTER LIST

1, 1A valve device
11, 11A housing
12, 12A, 12B, 12C main valve body (valve body)
12D valve body
12*a* communication passage
12*c* seating portion
12*d* molded boundary portion
14 pilot valve body
21 inner wall surface
22 valve port
23, 23A valve seat
31, 31A housing main body
32, 32A seat body
41, 41B, 41C, 41D seat portion
42, 42B, 42C, 42D sliding portion
42*a* engagement protrusion
42*c* sliding-portion-side flat face
42*d* locking protrusion
45 engagement portion
45*a* constriction
45*b* engagement-portion-side flat face
45*c* locking groove
51 seat body main body
52 valve seat member

The invention claimed is:

1. A hydrogen gas valve device for controlling a flow of hydrogen gas, the hydrogen gas valve device comprising:
a valve body; and
a housing that includes a valve port through which hydrogen gas flows, a valve seat around the valve port, and an inner wall surface into which the valve body is inserted and which is made of aluminum, chrome-molybdenum steel, or stainless steel;
wherein the valve body includes a seat portion that is made of non-thermal plasticity resin and is seated on the valve seat, and a sliding portion that is made of thermal plasticity resin and slides on the inner wall surface.

2. The hydrogen gas valve device according to claim 1,
wherein the seat portion has an engagement portion, and
wherein the sliding portion is arranged around the engagement portion and is immovably fixed relative to the seat portion.

3. The hydrogen gas valve device according to claim 2,
wherein the engagement portion is formed with a constriction that is recessed in a radial direction, and
wherein the sliding portion has an engagement protrusion that engages with the constriction.

4. The hydrogen gas valve device according to claim 2,
wherein the engagement portion has at least one engagement-portion-side flat face that intersects in a radial direction, and
wherein the sliding portion has a sliding-portion-side flat face that comes into contact with the engagement-portion-side flat face.

5. The hydrogen gas valve device according to claim 2,
wherein one of the engagement portion and the sliding portion has a locking groove that is recessed in a radial direction, and wherein the other of the engagement portion and the sliding portion has a locking protrusion that protrudes in the radial direction and engages with the locking groove.

6. The hydrogen gas valve device according to claim 1, wherein the valve body includes a molded boundary part in which the seat portion and the sliding portion are adjacent to each other on an outer surface of the valve body, and wherein, in the molded boundary part, a surface of secondary material that is one of the seat portion and the sliding portion is a rough surface.

7. The hydrogen gas valve device according to claim 1, wherein one of the seat portion and the sliding portion has a fitting hole with a bottom, wherein the other of the seat portion and the sliding portion has an engagement portion that engages with the fitting hole, and wherein the valve body is formed with a communication hole that connects a gap between the fitting hole and the engagement portion and an outer surface of the valve body.

8. The hydrogen gas valve device according to claim 1, further comprising:

a pilot valve body, wherein the valve body is a main valve body that has a communication passage communicating with the valve port and a seating portion, wherein the pilot valve body closes the communication passage by being seated on the seating portion, and wherein the seating portion is made of non-thermal plasticity resin.

* * * * *